Patented May 19, 1953

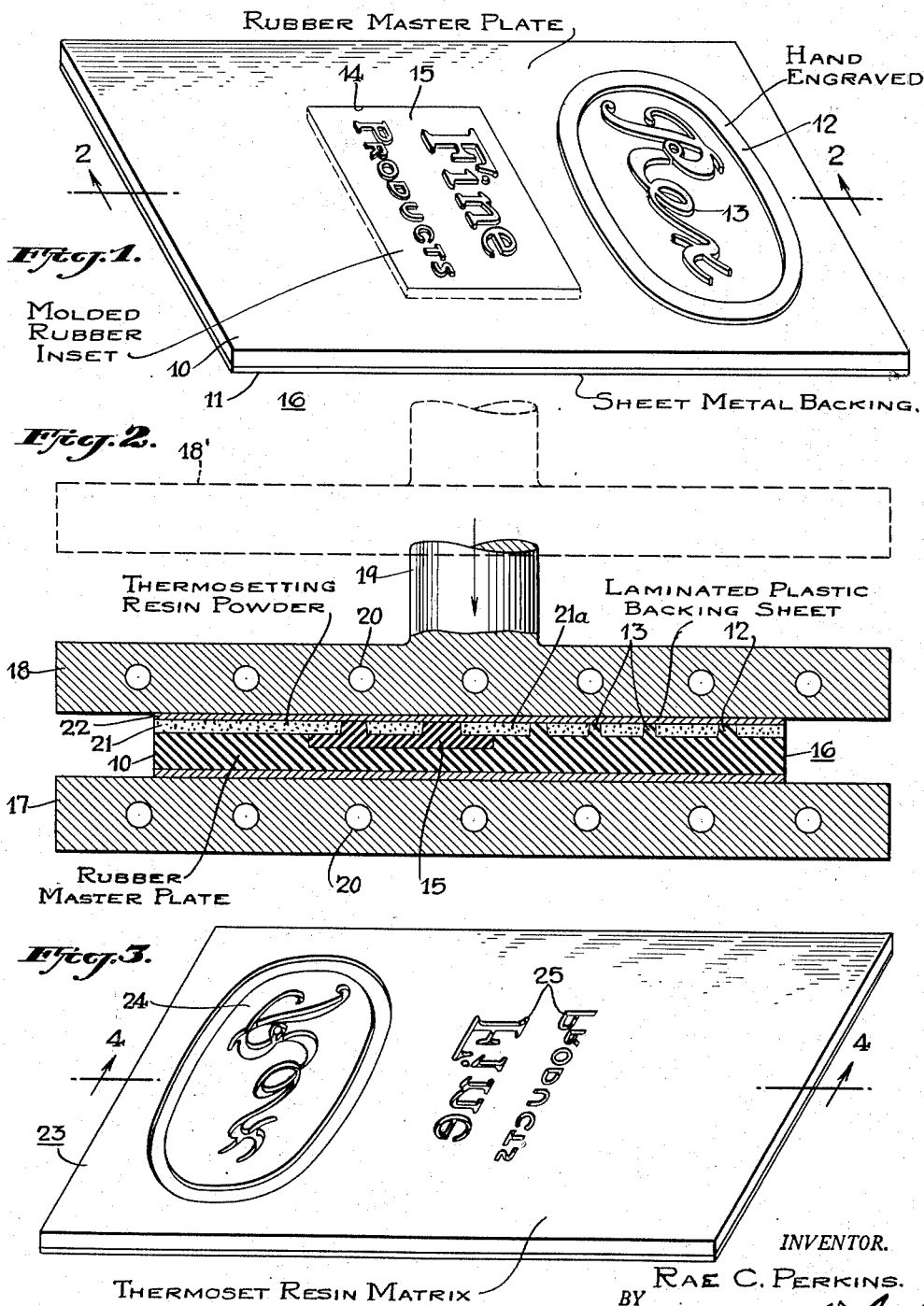

2,638,845

UNITED STATES PATENT OFFICE 2,638,845

METHOD FOR MAKING MATRICES FOR MOLDING RUBBER PRINTING BLOCKS

Rae C. Perkins, Oswego, N. Y., assignor to St. Regis Paper Company, New York, N. Y., a corporation of New York Application March 19, 1948, Serial No. 15,896

2 Claims. (Cl. 101—401.1)

This invention relates to novel methods for producing matrices adapted for repeated use for molding rubber printing die blocks.

The general purpose of the invention is to provide a dependable and simple procedure for producing accurate resinous matrices of the above-indicated character, which may be repeatedly used with a high degree of economy for making rubber printing die blocks of high quality with accurate and sharply defined designs of the desired printing matter.

The methods and means heretofore employing for producing rubber printing dies or blocks, embodying a printing design, such as can be produced only by a hand engraving operation, have consisted in the following: In accordance with one procedure the intricate design is produced on a metal plate by a process of photo-engraving or by hand engraving. The so-engraved plate is then employed for producing a matrix of a suitably impressionable material, and the resulting matrix thus obtained, is then used as a mold for molding the rubber printing block, under heat and pressure, from a vulcanizable rubber. These prior procedures of photo-engraving and hand engraving the intricate design in metal, are both quite expensive, and in addition the photo-engraving process produces only a relatively shallow design, and such as will be rapidly worn away when embedded, in the manner aforesaid, in a rubber printing block. An alternative proposal has been to hand engrave the intricate design in the rubber printing block itself, but this has the serious disadvantage, that as soon as the die block is worn out in printing operations, the hand engraving must be done all over again in a new printing block, each time such new block is required.

In accordance with my invention I propose to produce the intricate design, by hand engraving, in a block of engravable rubber, and to employ this block of so-engraved rubber, as a master die block for producing a matrix of thermosetting resinous material, from which any desired number of printing die blocks may be reproduced by molding uncured or vulcanized rubber therein, under combined heat and pressure. The cost of hand engraving the intricate design in engravable rubber, is quite inexpensive as compared to the metal slab photo-engraving and hand engraving procedures, heretofore employed as aforesaid. Also by employing the hand engraved rubber die block of my invention as a master die block for producing a matrix, from which the rubber printing die blocks are formed, the expense of producing rubber printing die blocks involving intricate design as aforesaid, is greatly reduced as compared to the prior procedure aforesaid, of hand engraving the intricate design in the rubber printing block per se.

It has heretofore been considered impossible, insofar as I am aware, to produce from an engraved rubber die block, embodying an intricate design, a matrix adapted for duplicating said design in rubber printing die blocks. In all previous attempts to produce such a matrix from an intricately engraved rubber die block, it has been found that intricately designed portions of the rubber die block are deformed or torn away from the block and embedded in the matrix, upon attempting to separate the two, so that not only is the engraved design of the rubber die block thus destroyed, but in addition the matrix is so impaired that it will not accurately reproduce the original engraved design in a rubber printing block molded from the matrix, so that the end product is of little or no value for purposes of reproducing a design by a printing operation.

In accordance with one aspect of my invention, I have effectively solved this problem as follows. I place the engraved rubber master die block face up on the lower platen of a heated press. I then apply to the upper or exposed surface of the die block, a copious coating of an oleaginous medium, such as an aqueous soap solution, to serve as an effective separating means between the rubber die block and the matrix. Thereupon, a finely ground thermosetting resinous molding powder such, for example, as a finely ground, thermosetting phenol-formaldehyde resin, is applied to the upper surface of the rubber die block to a height sufficient to cover the most upstanding portion of the design. I then preferably superimpose on the resulting assembly a thin backing sheet (about 0.125" thick) of laminated plastic material, consisting, for example, of superimposed sheets of fibrous material such as kraft paper, impregnated with and consolidated by a thermoset synthetic resin, such as phenol-formaldehyde resin aforesaid. The upper platen of the press is thereupon caused slowly to descend on the resulting assembly, gradually increasing the pressure until about 100 pounds per square inch is reached, the temperature of the press being meantime maintained at about 300 to 310° F., and the press held in this position for about 20 minutes, thus consolidating the resin powder into a solid structure, integrally bonded to the laminated plastic backing sheet, while curing the resin powder from the thermosetting to the thermoset condition. When this condition attains, the press is opened, the rubber die block and resulting resinous matrix removed therefrom, and the matrix stripped away from the die block. I have found that as a result of this molding procedure, and of the interposed copious layer of aqueous soap solution, that the resinous matrix strips cleanly and easily away from the engraved rubber die block, without in anywise deforming, tearing or marring the same, so that the matrix embodies a true and accurate complementary impression of the engraved design on the rubber die block.

The resinous matrix thus produced, may now be employed for producing any desired number, for example, a hundred or so, of rubber printing die blocks, by placing the matrix face up on the lower platen of a heated press, applying to the exposed upper face thereof a relatively thick layer of uncured or vulcanizable rubber, and thereupon causing the upper press platen to descend and apply heat and pressure, for example about 100 pounds per square inch pressure at a temperature of about 300 to 310° F., for about 6 minutes, thus to mold the matrix therein while curing the rubber. The upper press platen is then elevated, the matrix and associated rubber block removed therefrom and the rubber block stripped away from the matrix, thus producing a one-piece rubber printing block embodying the design in question. By duplicating this procedure any desired number of additional rubber printing blocks may thus be produced, either at the same time or at any subsequent time as desired. Also the engraved rubber master die block may be stored away, and employed for the future production of additional resinous matrices in the manner aforesaid whereby, with but one initial and relatively cheap engraving operation, an almost unlimited number of rubber printing die blocks may be quickly, cheaply and expeditiously reproduced therefrom, with resulting tremendous economies in quantity printing operations.

In many applications of the invention, it will be required that the rubber printing die block, print not only an intricate hand engraved design of the character aforesaid, but in addition, a legend in ordinary conventional type. In accordance with a further modification of my invention, it is not necessary that this legend of conventional type, be hand engraved in the original or master rubber die block. For this portion consisting of conventional type a die block insert of vulcanized rubber, embodying the printed portion, may be cemented in a cut-away portion of the master die block, this vulcanized die being made in the conventional manner by setting up the typed portion in ordinary metal foundry type, from which a suitable matrix is made by impressing the so-set-up foundry type in a suitable matrix material, from which the vulcanized rubber insert is made by applying a layer of uncured rubber to the so-impressed surface of the matrix, and curing the same in situ under combined heat and pressure.

Having thus described my invention in general terms, reference will now be had, for a more detailed description, to the accompanying drawings, wherein:

Fig. 1 is a perspective view of the master die block of engravable rubber, embodying a hand engraved design and also a vulcanized rubber insert as aforesaid, the latter embodying a legend in conventional type.

Fig. 2 is a view in sectional elevation illustrating the production of the resinous matrix from the master die block aforesaid, the section of Fig. 2 being taken through the master die block, substantially at 2—2 of Fig. 1.

Fig. 3 is a perspective view of the resinous matrix produced by the pressing operation of Fig. 2, and embodying an impression complementary to that of the master die block.

Figure 4:
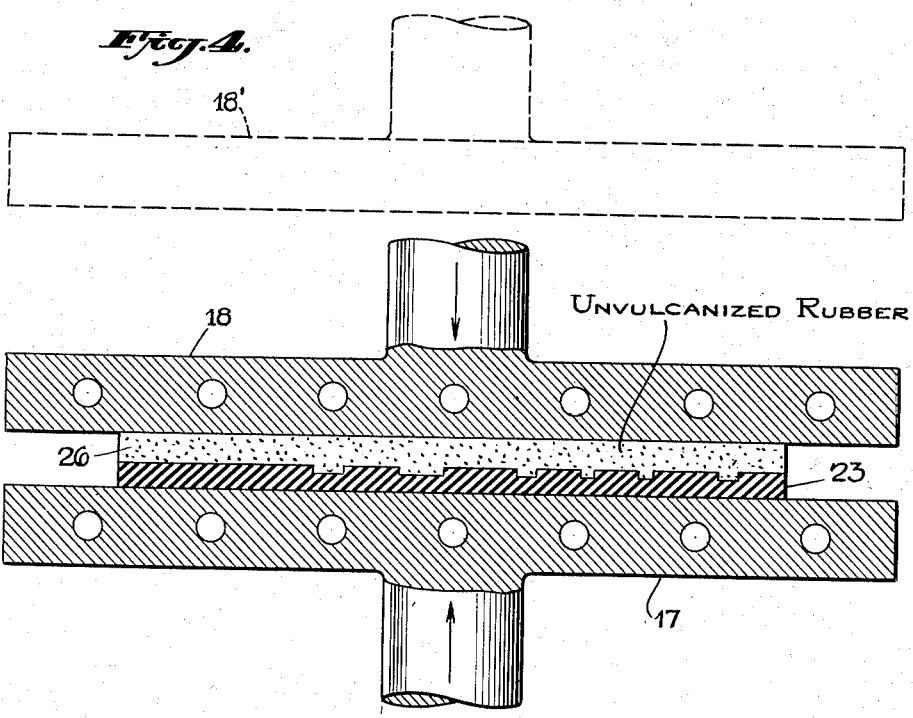
Fig. 4 is a view in sectional elevation taken through a heated press and illustrating the production of a vulcanized rubber printing die block from the resinous matrix of Fig. 3, the Fig. 4 section being taken through the resinous matrix substantially at 4—4 of Fig. 3.

Referring to Figs. 1 and 2, there is shown at 10 a rectangular sheet of 80 durometer, engravable rubber, to the underside of which is cemented a thin sheet of metal 11, such for example as a sheet of 0.09" thick, sheet steel, for imparting stiffness to the rubber sheet. The upper portion of the rubber sheet 10, embodies a hand engraved design, illustrated merely for purposes of simplicity, as comprising an embossed oval 12, within which is inscribed the embossed word "Rex" 13, in script. The rubber sheet 10 is cut away over the rectangular area 14, for reception of a molded vulcanized rubber insert 15, embodying the embossed legend "Fine Products" in conventional type. This molded rubber insert may be produced in a conventional manner, for example by setting up the legend "Fine Products" in founder's type, forming a matrix therefrom for example by pressing the same with combined heat and pressure into thermosetting laminated plastic sheet material, and employing the matrix thus produced for producing the molded rubber insert embodying the legend.

Referring now more particularly to Fig. 2, the master die block of Fig. 1, designated generally by the numeral 16, is now placed face up on the lower platen 17 of a press, provided with a cooperating upper platen or press plate 18 carried by a power actuated piston shaft 19, the press plates being heated, for example by circulation of steam through tubular passageways 20 therein, with the upper platen 18 in an elevated position as indicated by the dotted lines 18'. There is now applied to the entire upper surface 21a of the rubber die block 10, a copious coating of an aqueous soap solution, such as is obtained for example by dissolving a medium sized bar of soap in a quart of water. A finely ground thermosetting resinous powder 21, such for example as a phenol-formaldehyde thermosetting resin powder is thereupon applied to the upper surface of the rubber sheet 10 to a height corresponding substantially to the height of the embossed lettering and engraved portions 12, 13 thereon. There is now superimposed on this assembly a sheet of laminated plastic material 22, the latter composed for example of superimposed sheets of fibrous material, such as kraft paper, impregnated with and consolidated by a thermoset synthetic resin, such as phenol-formaldehyde resin, this laminated plastic sheet having a thickness for example of about 0.125".

With the assembly as thus shown, the upper press platen 18 is now actuated, slowly to descend from the position 18', to apply to the assembly a pressure which gradually increases until about 100 pounds per square inch is attained, meantime maintaining the press platens 17, 18, at a temperature of about 300 to 310° F., for example, 307° F. The combined heat and pressure are thus applied for a period of about 20 minutes, sufficient to consolidate the resin powder 21 into a solid structure integrally bonded to the laminated plastic sheet 22, and such as to cure the resin powder from the thermosetting to the thermoset condition. When this stage is arrived at, the upper press plate 18 is again elevated from position 18 to 18' and the die block 16 and resinous matrix formed thereon, removed from the press, the resinous matrix being then stripped away from the die block, to give a one-piece resinous matrix, such as illustrated generally at 23 in Fig. 4, embodying the engraved and printed portions 24, 25 in the form of reverse, intaglio impressions as shown.

For producing a molded rubber printing die block as aforesaid, the matrix 23 of Fig. 3 is now placed, referring to Fig. 4, face up on the lower press platen 17 with the upper platen 18 in the elevated position 18'. There is now applied to the upper surface of the matrix 23 a relatively thick layer 26 of uncured or vulcanizable rubber, i. e., uncured rubber that will flow under combined heat and pressure, and become vulcanized thereby. The upper press plate is now caused to descend from position 18' to 18 until a pressure of about 100 pounds per square inch is applied to the interposed matrix and rubber overlie 23, 26, the temperature of the press plates 17, 18 being again maintained at about 300 to 310° F., preferably 307° F., the pressure and temperature being so applied for a period of about 6 minutes, sufficient to cure and vulcanize the rubber overlie. Thereupon the upper press plate 18 is elevated from position 18 to 18', the assembly 23, 26 removed therefrom, and the rubber overlie 26 stripped away from the matrix 23, to give a resulting one-piece rubber printing die block such as shown generally at 27 in Fig. 5. It will be observed that this printing die block 27 is a duplicate or replica of the master die block 16, Fig. 1, except for its one-piece construction. It bears a replica of the engraved portions 12, 13 and also of the printed legend 15.

Figure 5:
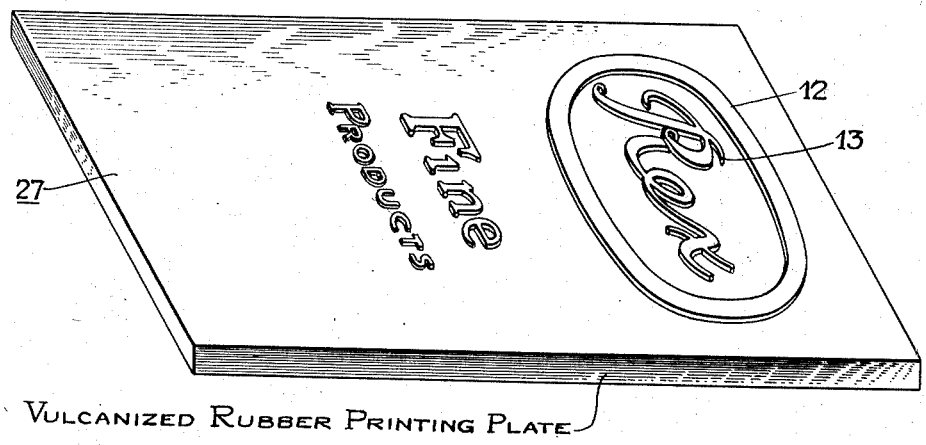
Fig. 5 is a perspective view of the one-piece, vulcanized rubber, printing die block resulting from the pressing operation of Fig. 4.

For producing additional rubber printing die blocks 27 of Fig. 5, the matrix 23 is of course returned to the molding machine, and the procedure described in connection with Fig. 5, repeated. It has been found in actual practice that a resinous matrix such as 23, will serve to produce as many as a hundred or so rubber printing die blocks, in the manner illustrated in Figs. 4 and 5. However, additional resinous matrices, such as 23, may be produced from the master rubber die block 16, by repeating the procedure described in connection with Fig. 2.

Although in the presses illustrated in Figs. 2 and 4 as above described, the lower press platen 17 has been described as stationary, and the upper press platen 18 as elevatable and depressable with respect thereto, in many presses of this type the opposite mode of operation occurs, that is to say, the upper press platen 18 is stationary and the lower press platen 17 elevatable and depressable with respect thereto. My invention contemplates the use of a press of either type.

What I claim is:
1. Method for producing a one-piece resinous matrix adapted for repeated use for molding rubber printing dies, which method comprises engraving the design which is desired to be printed, by cutting same in the surface of a pliable vulcanized rubber block, superimposing upon said design a layer of finely divided thermosetting resinous material to a depth sufficient substantially to cover the engraving forming said design after first applying upon the block a coating to separate the resin from the rubber, covering such block and the resinous material thereon with a fibrous backing layer, thereafter subjecting the resulting assembly to an elevated temperature while gradually applying heavy pressure thereto, the heat and pressure applied being sufficient to consolidate the finely divided material integrally with the backing layer into a solid thermoset matrix embodying the complement of said design, but insufficient to cause any substantial deformation or marring of the design as engraved in the pliable rubber block, and removing the resulting matrix from the rubber block.

2. Method for producing a one-piece resinous matrix adapted for use for molding rubber printing dies, which are to embody an engraved design and also a legend of conventional type, which method comprises engraving the desired design upon a somewhat pliable vulcanized rubber block, also securing to said block a vulcanized rubber block embodying the legend of conventional type, applying an oleaginous coating to the surfaces embodying said design and legend and superimposing thereon a layer of finely divided synthetic thermosetting resinous molding material, superimposing on said layer a backing of fibrous material, thereafter subjecting the resulting assembly to an elevated temperature while gradually applying heavy pressure thereto, the heat and pressure applied being sufficient to consolidate the finely divided material integrally with the backing layer into a solid thermoset matrix embodying the complement of said design and legend, but insufficient to cause any substantial deformation or marring of the design as engraved in the pliable rubber block, and removing the resulting matrix from the rubber block.

RAE C. PERKINS.

References Cited in the file of this patent
UNITED STATES PATENTS

| Number | Name | Date |
|---|---|---|
| 1,377,513 | Novotny | May 10, 1921 |
| 1,377,519 | Novotny | May 10, 1931 |
| 1,401,633 | Novotny | Dec. 27, 1921 |
| 1,442,173 | Novotny | Jan. 16, 1923 |
| 1,534,527 | Joseph | Apr. 21, 1925 |
| 1,589,665 | Schmutz | June 22, 1926 |
| 1,920,058 | Buck | July 25, 1933 |
| 1,942,683 | Chambers | Jan. 9, 1934 |
| 1,947,986 | Harley | Feb. 20, 1934 |
| 2,014,043 | Harbison | Sept. 10, 1935 |
| 2,040,377 | Harley | May 12, 1936 |
| 2,139,054 | Wilson | Dec. 6, 1938 |
| 2,330,002 | Moss | Sept. 21, 1943 |